(No Model.)
L. C. RODIER.
COMBINED RADIATOR AND HEATING OVEN.
No. 323,209. Patented July 28, 1885.
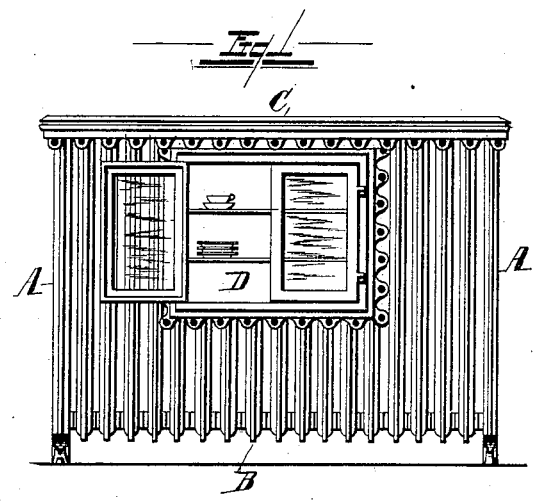
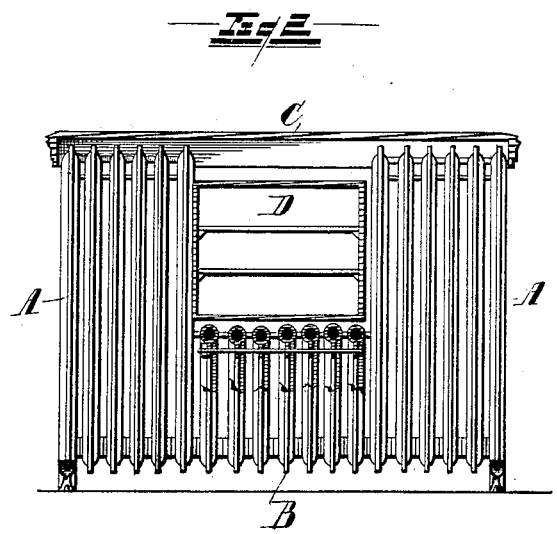
WITNESSES
Samuel E. Thomas
N. S. Wright
INVENTOR
Louis C. Rodier
By W. W. Leggett
Attorney
N. PETERS, Photo-Lithographer, Washington, D. C.

United States Patent Office.

LOUIS C. RODIER, OF DETROIT, MICHIGAN.

COMBINED RADIATOR AND HEATING-OVEN.

SPECIFICATION forming part of Letters Patent No. 323,209, dated July 28, 1885.

Application filed October 11, 1884. (No model.)

*To all whom it may concern:*

Be it known that I, LOUIS C. RODIER, of Detroit, county of Wayne, State of Michigan, have invented a new and useful Improvement in Combined Radiator and Heating - Oven; and I declare the following to be a full, clear, and exact description of the same, such as will enable others skilled in the art to which it pertains to make and use it, reference being had to the accompanying drawings, which form a part of this specification.

My invention consists of the combinations of devices and appliances hereinafter specified, and more particularly pointed out in the claims.

In the drawings, Figure 1 is a view in elevation of a radiator involving my invention. Fig. 2 is a longitudinal section of the same.

This invention has for its object the provision, in combination with a radiator, of a heating-oven in which plates or food may be kept hot until ready for the table.

In carrying out my invention, A represents long loops and B short loops of a radiator, and C a top.

In constructing a radiator, the long loops and the short loops are so arranged with reference to each other that they will leave a space for an oven, D. This oven I prefer to make separate, so that it may be readily introduced in place when the radiator-loops have been put together. The oven is also preferably provided with one or more removable shelves, D'. I form the radiator of separate loops screwed or otherwise fastened together by hubs at their bases or at their bases and tops. In this way a radiator of this character can be readily assembled from longer or shorter loops without trouble and without extra expense. Such a construction is shown in Fig. 2.

This is equally well adapted for either steam or hot-water radiators. This oven may, if desired, have doors upon both sides, so that the oven may be entered from either side of the radiator, and I have employed it in that way; or it may have doors upon one side only.

What I claim is—

1. A radiator composed of a series of short loops or pipes, said series located between higher loops or pipes, and the space thus left between the high loops and above the shorter ones provided with an oven, substantially as described.

2. A radiator consisting of long and short loops or pipes, a heating-oven located in the space above the short loops, and a common top covering the whole structure, substantially as described.

3. A radiator consisting of long loops or tubes and short loops or tubes, said loops or tubes made separate and united at their bases, so as to communicate with each other, and in connection therewith a heating-oven located in the space above the short tubes, substantially as described.

In testimony whereof I sign this specification in the presence of two witnesses.

LOUIS C. RODIER.

Witnesses:
 N. S. WRIGHT,
 M. B. O'DOGHERTY.